United States Patent [19]

Koike

[11] Patent Number: 4,546,786

[45] Date of Patent: Oct. 15, 1985

[54] FLOW CONTROL VALVE

[75] Inventor: Ichiro Koike, Higashimatsuyama, Japan

[73] Assignee: Jidosha Kiki Co., Ltd., Tokyo, Japan

[21] Appl. No.: 475,984

[22] Filed: Mar. 16, 1983

[30] Foreign Application Priority Data

Mar. 26, 1982 [JP] Japan .............................. 57-43018[U]

[51] Int. Cl.$^4$ ............................................. G05D 11/03
[52] U.S. Cl. ...................................... 137/117; 137/118
[58] Field of Search ................................. 137/117, 118

[56] References Cited

U.S. PATENT DOCUMENTS 3,289,688 12/1966 Malott ................................. 137/117
4,244,389 1/1981 Shimoura et al. .................... 137/117

Primary Examiner—Alan Cohan
Attorney, Agent, or Firm—Flynn, Thiel, Boutell & Tanis

[57] ABSTRACT

A flow control valve is provided which is interposed between the discharge port of an oil pump and a hydraulic device for supplying a necessary amount of hydraulic oil to the hydraulic device, as such oil is discharged by the oil pump. The flow control valve includes a spool valve which is slidably fitted in a valve bore for reciprocatory displacement therein, thus opening or closing a return path for the oil which leads to a tank. A land on the spool valve is formed with an edge of a diameter which is slightly less than the internal diameter of the valve bore, thereby defining a variable orifice between the edge and an adjacent edge of the opening of the return path.

1 Claim, 20 Drawing Figures

21

22

24

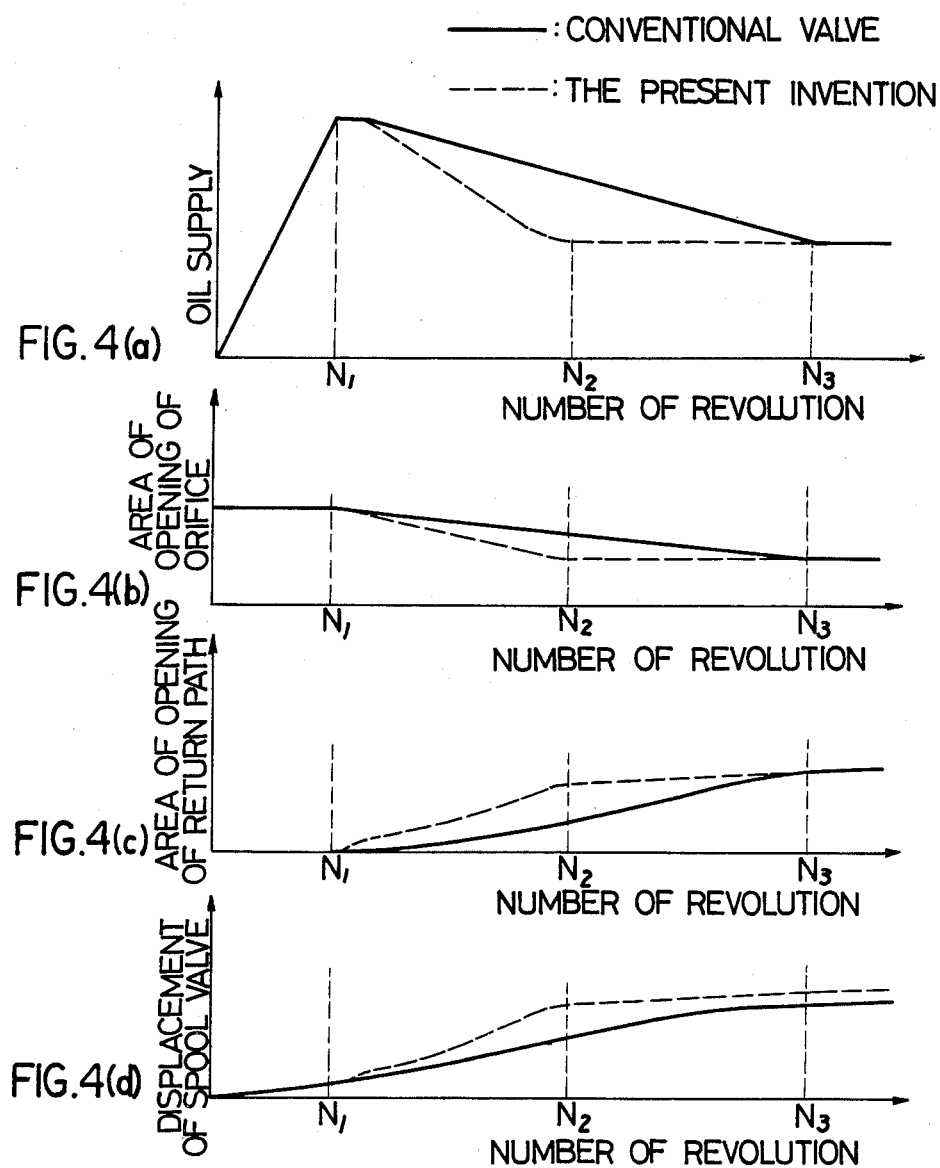

FLOW CONTROL VALVE

BACKGROUND OF THE INVENTION

The invention relates to a flow control valve connected between the discharge port of an oil pump and a hydraulic device for controlling the flow rate of oil supplied to the device.

In a power steering apparatus, for example, it is necessary to adjust the supply of hydraulic oil in accordance with the running speed of a vehicle. Specifically, at low speeds, it is necessary to supply an increased amount of hydraulic oil in order to keep the required steering force low. On the contrary, at high speeds, it is necessary that the supply of hydraulic oil be reduced to increase the steering force in order to achieve the running stability. To accommodate for this need, a flow control valve is frequently provided between the power steering apparatus and an oil pump. Such flow control valve may comprise, for example, an orifice and a valve bore formed in a flow path which provides a communication between the apparatus and the oil pump. A spool valve is fitted in the valve bore so as to move forwardly and rearwardly in accordance with a pressure differential across the orifice so that the oil discharge increases in accordance with a vehicle speed or the number of revolutions of the pump. As the pressure differential across the orifice become equal to or exceeds a given value, the spool valve moves in a direction to reduce the opening of the orifice and also opens a return path to a tank, thus returning an excess amount of oil to the tank to thereby reduce the supply of oil to the power steering apparatus.

FIG. 1 shows one examplary form of flow control valve of the kind described. The valve includes a housing 1 in which a valve bore 2 is defined and communicates through a suction passage 3 with the discharge port of an oil pump, not shown, and also communicates with a power steering apparatus, not shown, through a discharge path 4. A return path 5 communicating with a tank, not shown, is connected to the bore. In a region opening into the valve bore 2, the suction passage 3 is formed with a fixed orifice 6 and a variable orifice 7, the opening of which can be varied by a spool valve 9 as can be the opening 8 of the return path 5. Specifically, the spool valve 9 is slidably fitted in the bore 2, and is normally urged by a spring 10 in a direction to block the opening 8. In its inoperative position, the spool valve stays at rest with a stop 11 projecting from the end face of the spool valve 9 bearing against the end wall of the bore 2, thus blocking the return path 5 while fully opening the variable orifice 7. However, when a pressure differential across the orifices 6, 7 becomes equal to or exceeds a given value, the spool valve 9 is moved to the left against the resilience of the spring 10, thus beginning to open the return path 5 as shown, and reducing the opening of the variable orifice 7.

FIG. 2 graphically shows a response of the flow control valve in terms of the flow rate of oil supplied to the power steering apparatus. The response of the described valve is represented by a solid line curve A in FIG. 2. Specifically, at a low number of revolutions of the pump, the oil supply increases with an increase in the number of revolutions. At a number of revolutions $N_O$, the spool valve 9 begins to open the return path 5, whereby an excess amount of oil is returned to the tank, thus maintaining a constant value $Q_1$ for the oil supplied to the power steering apparatus. When the number of revolutions increases to a value $N_1$, the spool valve 9 begins to reduce the opening of the variable orifice 7 and hence the amount of oil discharged into the discharge path 4. When the number of revolutions becomes equal to or exceeds another value $N_2$, the spool valve 9 completely blocks the variable orifice 7, whereby only the hydraulic oil passing through the fixed orifice 6 is discharged into the path 4, thus maintaining the oil supply at a constant value $Q_3$.

Assuming that the oil supply $Q_3$ to the power steering apparatus at the number of revolutions $N_2$ of the pump represents an ideal value, it follows that the oil supply $Q_1$ at or near the lower number of revolutions $N_1$ is not sufficient, producing a steering force which is excessively high. On the other hand, if the opening of the orifice is increased to produce a sufficient oil supply of a value $Q_2$ at the lower number of revolutions $N_1$, the opening of this orifice cannot be reduced substantially unless the number of revolutions of the pump increases to a greater value. As shown by a solid line curve B, when the vehicle is running at a high speed, the oil supply cannot be reduced to the value $Q_3$ unless the number of revolutions increases to a greater value $N_3$, thus resulting in a disadvantage that the steering force is excessively low at high speeds of the vehicle. As a consequence, it has been difficult in the prior art to provide an ideal response, as represented by a broken line curve C shown in FIG. 2, which assures an optimum oil supply at both high and low speeds of the vehicle.

SUMMARY OF THE INVENTION

It is an object of the invention to provide a flow control valve exhibiting a stabilized performance.

It is another object of the invention to provide a flow control valve capable of supplying a required and sufficient amount of oil at low number of revolutions of the pump for which a hydraulic device requires an increased amount of hydraulic oil and allowing an excess amount of oil to be positively returned to a tank at a higher number of revolutions of the pump.

Such objects are achieved in accordance with the invention by forming an edge of a land on a spool valve, which opens or closes a return path to a tank, with a diameter which is slightly less than the internal diameter of a valve bore, thereby forming a variable orifice therebetween.

Other objects and advantages of the invention will become apparent from the following description with reference to the drawings.

BRIEF DESCRIPTION OF THE DRAWINGS

FIGS. 4(a) to (d) graphically show the oil supply, the opening area of an orifice, the opening area of a return path and the displacement of a spool valve, for both the valve of the invention and a conventional valve;

DESCRIPTION OF EMBODIMENTS

Figure 1:
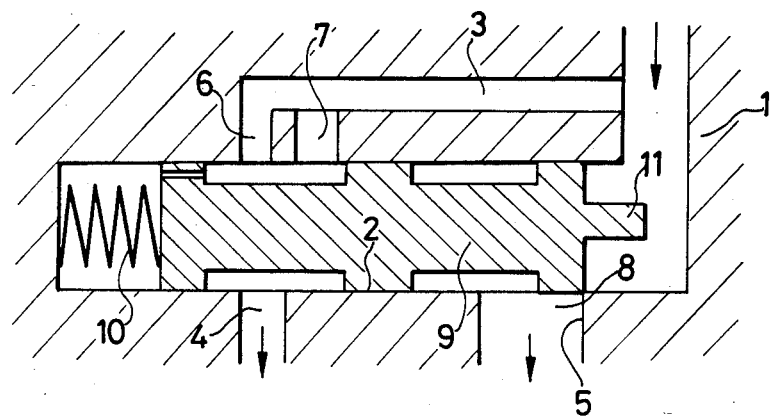
FIG. 1 is a schematic section of a conventional valve.
Figure 2:
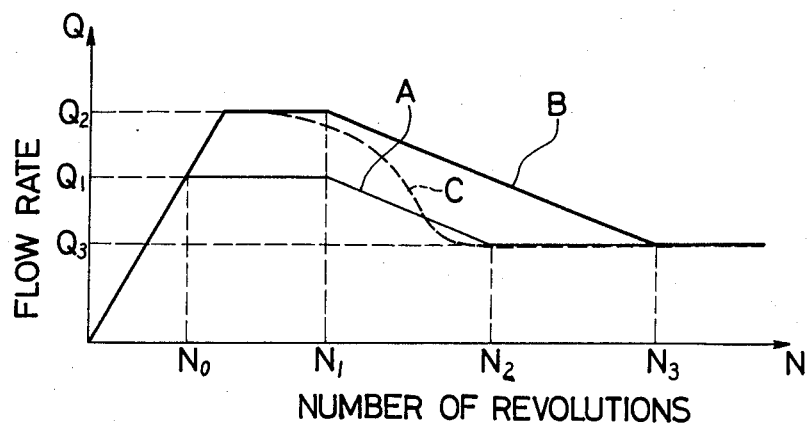
FIG. 2 graphically shows an ideal response of a valve as compared with corresponding responses of conventional valves.
Figures 3, 6C, 6E:
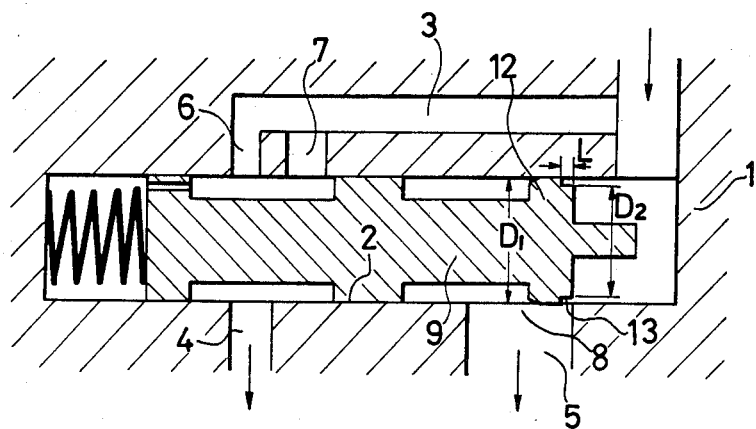
FIG. 3 is a schematic section of one embodiment of the invention.
FIGS. 6(a) to (e) are sections illustrating other forms of a land on the spool valve.

Referring to FIG. 3, there is shown a flow control valve in accordance with one embodiment of the invention. It should be noted that similar parts are designated by like reference characters as those used in FIG. 1. Specifically, a spool valve 9 includes a land 12 which is effective to open or close a return path 5. The land 12 has an edge 13 of a diameter which is slightly less than that of a valve bore 2. In the present embodiment, the land 12 has a diameter $D_1$ which is equal to 18 mm, the edge 13 has a diameter $D_2$ which is equal to 17.5 mm, and the axial length L of the edge 13 is chosen to be in a range from 0.5 to 2.0 mm. These factors preferably lie in the following ranges:

$D_1$: 10 to 25 mm $D_2$: 8 to 24.8 mm

L: 0.5 to 3.0 mm

As a result of forming the edge 13 on the land 12 which is slightly reduced than the diameter of the valve bore, a variable orifice is defined between the edge 13 and an adjacent edge of the opening 8 of the return path 5. This allows an ideal response to be achieved in controlling the oil supply to a power steering apparatus, as will be discussed in detail below.

Figure 5A:
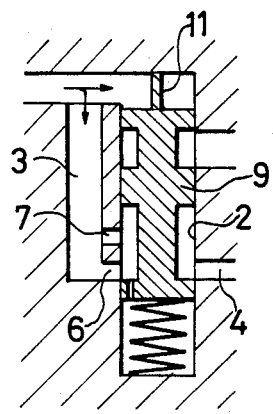
FIGS. 5(a) to (d) are schematic sections, illustrating the displacement of a spool valve in a conventional valve.
Figure 5B:
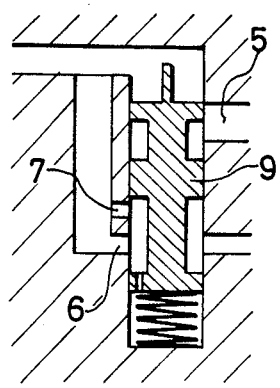
Figure 5C:
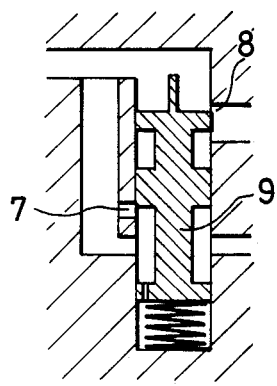
Figure 5D:
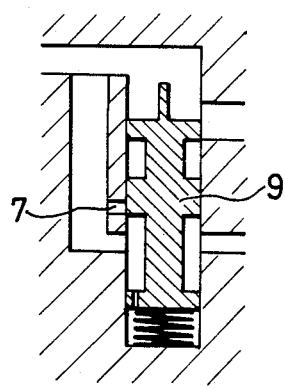
Figure 5E:
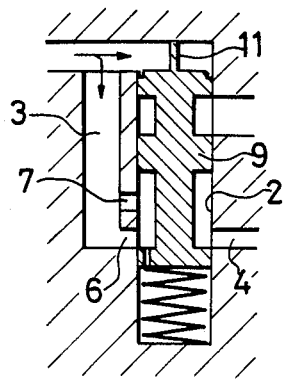
FIGS. 5(e) to (h) are schematic sections, illustrating the displacement of a spool valve in the arrangement of the invention.
Figure 5F:
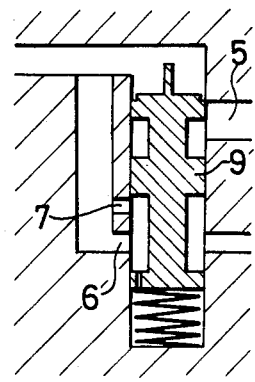

FIGS. 4(a) to (d) and FIGS. 5(a) to (h) show a comparison between the functioning of the present embodiment and a conventional arrangement. Specifically, FIG. 4(a) shows the oil supply to the power steering apparatus, FIG. 4(b) the total opening area of the orifices 6 and 7, FIG. 4(c) the opening area of the return path 5, and FIG. 4(d) the displacement of the spool valve 9. In these Figures, a solid line represents the response of the conventional arrangement while broken lines represent the response of the embodiment of the invention. FIGS. 5(a) to (h) illustrate various displacements of the spool valve 9, and FIGS. 5(a) to (d) represent the displacements of the conventional arrangement while FIGS. 5(e) to (h) represent the displacements of the embodiment of the invention. FIGS. 5(a) and (e) correspond to the inoperative condition, FIGS. 5(b) and (f) correspond to a number of revolutions $N_1$ of the pump, FIGS. 5(c) and (g) to a number of revolutions $N_2$ of the pump, and FIGS. 5(d) and (h) to a number of revolutions $N_3$ of the pump, respectively. In its inoperative condition, the spool valve 9 bears against the end wall of the valve bore 2 through the stop 11 in both the embodiment of the invention and the conventional arrangement, whereby the suction passage 3 communicates with only the discharge path 4 through the orifices 6 and 7 and through the bore 2. As the pump begins to rotate, the hydraulic oil is entirely discharged through the discharge path 4 [see FIGS. 5(a) and (e)]. As the number of revolutions of the pump increases to thereby increase the amount of oil discharged, the pressure differential across the orifices 6 and 7 increases, causing the spool valve 9 to be displaced. At the number of revolutions $N_1$, the return path 5 begins to open [see FIGS. 5(b) and (f)]. The variable orifice 7 is completely open immediately before the return path 8 opens, and accordingly, the oil supply is at its maximum [see FIG. 4(a)] under this condition.

As the number of revolutions of the pump continues to increase, the spool valve 9 is displaced to a greater degree, thus opening the return path 5 and reducing the opening of the orifice 7. It is to be noted that in the present embodiment, a variable orifice is defined between the edge 13 to the land of the spool valve 9 and the adjacent edge of the opening 8 of the return path at such time, causing an increase in the resistance of the flow path, which in turn acts to increase the displacement of the spool valve 9 as compared with the conventional arrangement. As a result of such difference, it will be seen that at the number of revolutions $N_2$ of the pump, the conventional arrangement fails to reduce the area of the variable orifice 7 sufficiently [FIG. 5(c)] and hence the oil supply is not reduced sufficiently [FIG. 4(a)], while in the embodiment of the invention, the orifice 7 is completely closed [FIG. 5(g)] and the oil supply is reduced to a value which is required [FIG. 4(a)].

Figure 5G:
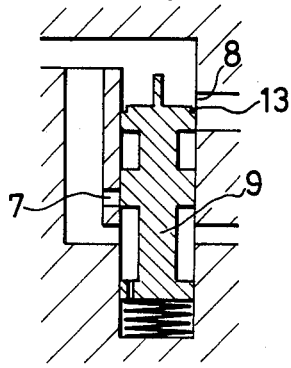
Figure 5H:
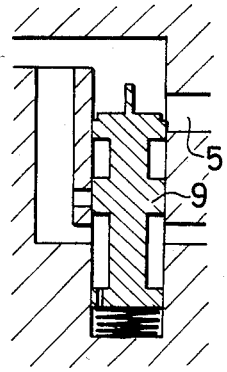

As the number of revolutions of the pump further increases, the spool valve 9 continues to be displaced and the orifice 7 is closed at the number of revolutions $N_3$ in the conventional arrangement [FIG. 5(g)], thus reducing the oil supply to the required value. On the other hand, in the embodiment of the invention, the return path 5 is opened to a greater degree than at the number of revolutions $N_2$, so that the oil supply to the power steering apparatus will remain substantially the same as at the number of revolutions $N_2$ despite an increased number of revolutions of the pump, thus maintaining a desired amount of oil supply.

An operation which is opposite to that described above occurs when reducing the number of revolutions of the pump.

As discussed, by forming the edge 13 of a land on the spool valve 9 with a diameter, in the arrangement of the invention, which is slightly less than the diameter of the valve bore, it is assured that the spool valve 9 undergoes an increased displacement and the orifice 7 is closed at a number of revolutions $N_2$ of the pump where the oil supply should be minimized. In this manner, the oil amount can be reduced as compared with the conventional arrangement.

Figure 6A:
Figure 6B:
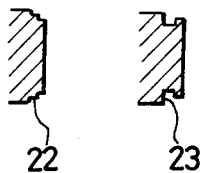
Figure 6D:
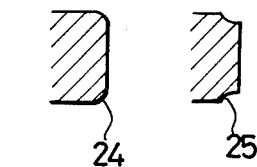

FIGS. 6(a) to (f) show various configurations of the land 12 which may be used in the present invention. Thus, the land may be formed with a taper 21 as shown in FIG. 6(a), or may be formed with a plurality of steps 22, 23 as shown in FIGS. 6(b) and (c). Alternatively, the edge may be rounded as shown at 24 and 25 in FIGS. 6(d) and (e).

What is claimed is:

1. A flow control valve adapted to be placed in a hydraulic fluid flow path that extends from the discharge port of an oil pump to a load device that is operable by the hydraulic fluid, and including a return path connecting the hydraulic fluid flow path with a tank associated with said oil pump so that hydraulic fluid can be returned to said tank, said flow control valve comprising: a housing having an elongated cylindrical valve bore therein, an inlet passage adapted to be connected to said discharge port of said oil pump for receiving hydraulic fluid therefrom, a first adjustable orifice connecting said valve bore with said inlet passage so that hydraulic fluid can be supplied to said bore, a load port extending from said valve bore and providing a discharge path which is adapted to be connected to said load device so that the hydraulic fluid can be supplied to said load device through said first orifice and valve bore and load port, a return port extending from said valve bore and adapted to be connected to said return path, said inlet passage communicating with one end of said valve bore to a location close to said return port and remote from said first orifice; a valve spool disposed in said valve bore for longitudinal sliding movement therein, said valve spool having a first cylindrical land adapted to move across and adjust the effective size of said first orifice and having a second cylindrical land adapted to move across and adjust the effective size of said return port, said valve spool being movable in said valve bore in response to a pressure difference across said first orifice between a first position in which said second land blocks said return port from said inlet passage and said first land is out of blocking relationship with said first orifice so that said first orifice is fully open and communicates with said load port, and a second position in which said second land places said inlet passage in communication with said return port and said first land partially blocks communication between said first orifice and said load port, said second land of said valve spool having an edge in the form of a concentric cylindrical end portion of uniform reduced diameter smaller than the diameter of the remainder of said second land and the diameter of said bore, said end portion projecting longitudinally in said bore and toward said inlet passage and being joined to the remainder of said second land by an outwardly projecting shoulder so that said end portion defines an annular notch of uniform width that opens toward said inlet passage, the zone between the longitudinal wall of said end portion and the opposing edge of said return port defining an elongated variable orifice for controlling the rate of flow of the hydraulic fluid from said inlet passage to said return path, said first and second lands being relatively positioned so that said variable orifice begins to unblock said blocked return port of said return path, and hence start it to gradually open to communication with said valve bore as said first adjustable orifice begins to close when said valve spool is moving from said first to said second position and, as said variable orifice begins to open, said end portion is located to maintain the pressure that acts to move said valve spool until said end portion has moved past the opposing edge of said return port, said end portion having an axial length L in the range of about 0.5 mm to 3.0 mm, the radial thickness $(D_1-D_2)\div 2$ of said elongated variable orifice being in a range from no less than 0.1 mm up to at least 0.25 mm, where $D_1$ is the diameter of the second land and $D_2$ is the diameter of said uniform reduced diameter end portion.

* * * * *